United States Patent [19]

Bare

[11] 4,231,180
[45] Nov. 4, 1980

[54] DISPOSABLE ANIMAL TRAP

[75] Inventor: W. Wayne Bare, R.R. #2-Beal Rd., Princeville, Ill. 61559

[73] Assignee: W. Wayne Bare, Wyoming, Ill.

[21] Appl. No.: 954,431

[22] Filed: Oct. 25, 1978

[51] Int. Cl.³ .............................................. A01M 23/02
[52] U.S. Cl. ........................................................ 43/61
[58] Field of Search ...................... 43/61, 60, 58, 62, 81

[56] References Cited

U.S. PATENT DOCUMENTS

| | | | |
|---|---|---|---|
| 451,163 | 4/1891 | Skinner | 43/61 |
| 1,307,763 | 6/1919 | Sterbenz | 43/61 |
| 1,587,536 | 6/1926 | Lobit | 43/61 |
| 4,127,958 | 12/1978 | Peters et al. | 43/81 |

Primary Examiner—Nicholas P. Godici
Assistant Examiner—Roscoe V. Parker
Attorney, Agent, or Firm—McCaleb, Lucas & Brugman

[57] ABSTRACT

A disposable trap for small animals, such as mice or similar rodents, in which a pair of co-axially slideable, interfitting plastic members, namely a hollow plunger and an outer housing therefor, are biased axially towards one another by means of an axially imposed external force supplied by an elastic band, or the like, operational to move the two members toward each other. The plunger is substantially enclosed on all sides except for an animal entrance to its hollow interior and the outer housing is fully enclosed except for one end into which the plunger co-extensively fits. When the two members are axially collapsed so that the outer housing surrounds the plunger, the animal entrance is closed off to entrap an animal within the interior of the plunger. A flexible cantilever type trigger plate extends from one end of the outer housing into the trapping chamber of the plunger and suitable detent means are provided to maintain such members in their separated or extended condition. When the animal enters the trapping chamber and releases the detent means by depressing the trigger plate, the plunger is moved rapidly into the outer housing which thereupon blocks off the animal entrance, preventing escape. One end wall of the plunger optionally is removable to afford reuse of the trap, if desired.

5 Claims, 4 Drawing Figures

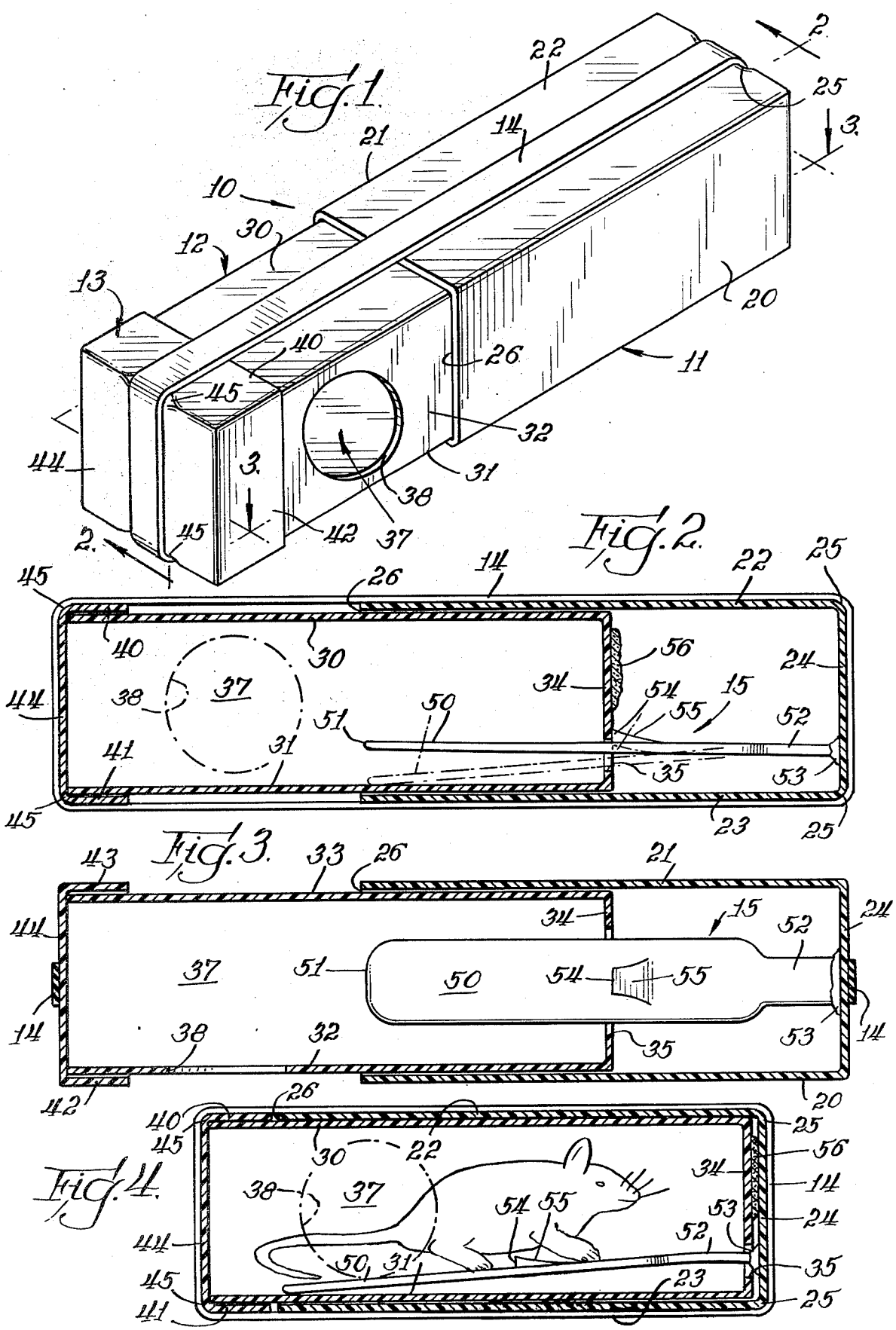

DISPOSABLE ANIMAL TRAP

SUMMARY OF THE INVENTION

In brief, the improved trap of this invention employs a pair of co-axially aligned, internesting, generally elongated hollow members which are slideably internested and arranged so that the inner or plunger member is movable axially into the interior of the outer housing. The plunger is substantially enclosed on all walls except for an opening in one side thereof which provides an animal entrance into the plunger's interior trapping chamber. The housing is also enclosed on all walls except for one open end into which the plunger closely fits. A flexible cantilever type trigger plate, supported within the outer housing extends through a suitable opening in an adjacent end of the plunger and is provided with appropriate detent means for interlocking such members in a predetermined position so as to prevent their movement toward one another. Means for rapidly moving the plunger into the outer housing upon releasing action of the detent, is provided by an elastic member, or the like, trained over and between opposite ends of the two housings so as to provide appropriate force for urging such two members toward one another.

Among the unique features and advantages of this invention is the provision of a simple throw away mouse trap, having an optional reuse capability and embodying simplified structural and operational features conducive to economical manufacture and improved operator safety. Since the operating principles of this invention are directed to the live entrapment of an animal, as opposed to execution, by fully enclosing the live animal within an interior trapping chamber, totally inaccessible to the user or operator, the latter's safety is greatly enhanced since he is totally isolated from the animal and therefore is not susceptible to being bitten or contaminated thereby. Further, since the triggering device employed in the combination of elements is also totally enclosed and inaccessible to the user, operating safety of the trap is promoted by insulating the user from the hazards of accidental tripping of the trigger mechanism.

It is among the principle objects of this invention to provide an improved throw away mouse trap having optional reuse capability.

It is a further object of this invention to provide a throw away mouse trap as aforesaid which utilizes a fully enclosed and protected triggering mechanism promotional of operator safety.

It is still a further object of this invention to provide an improved throw away mouse trap utilizing a pair of co-axially movable members, one of which moves into the interior of the other to entrap the live animal.

It is another object of this invention to provide a new and improved trap for small animals, such as rodents and the like, employing a simplified arrangement of parts capable of producing a dependable entrapment function and which readily lends itself to economies of production and assembly.

Still another object of this invention is to provide an improved mouse trap having operating features protective of the user's health and safety.

Having described this invention, the above and further objects, features and advantages thereof will appear from time to time in conjunction with the following description of the preferred embodiment thereof illustrated in the accompanying drawings and constituting the best mode presently contemplated for enabling those of skill in the art to make and practice this invention.

IN THE DRAWINGS

FIG. 1 is a perspective showing of the assembled mouse trap, in accordance with this invention, and illustrating the same in operating condition for the entrapment of a live animal;

FIG. 2 is a medial vertical cross-sectional view taken substantially along vantage line 2—2 of FIG. 1 and looking in the direction of the arrows thereon;

FIG. 3 is a medial horizontal sectional view thereof, taken substantially along vantage line 3—3 of FIG. 1; and FIG. 4 is a medial vertical cross-sectional view of the trap illustrated in FIG. 1 and demonstrating the relationship of parts when the trap is sprung.

DESCRIPTION OF THE PREFERRED EMBODIMENT

Turning now to the features of the preferred embodiment of this invention illustrated in the accompanying drawings, initial reference is made to FIG. 1 whereat the assembled trap indicated generally by numeral 10, comprises an outer housing member 11, and a plunger member 12, having removable end cap 13 at an outer end thereof; the two members 11 and 12 being co-axially internested and normally biased toward one another by a resilient closing means 14 trained about the exterior and over opposite ends of the two members. As best shown in FIGS. 2 and 3, a trigger means 15 is provided within the interior of the housing member for cooperation with the plunger member 12.

Turning to the specifics of the outer housing member 11, as best illustrated in FIG. 1, the same comprises a hollow rectangular parallelopiped having opposing rectangular sidewalls 20, 21, corresponding rectangular top and bottom walls 22 and 23 and one outer end wall 24 (see FIGS. 2 and 3). Preferably the several walls of the housing 11 are unified and integrally formed as by molding plastic, for economy and ease of manufacture. For this purpose, preferably materials having the requisite rigidity and toughness such as selected polyurethanes, polystyrenes, epoxy resins, and polyesters, among others, are acceptable in practice. It will be noted, in particular, that the junctures of the end wall 24 with the top and bottom walls 22 and 23 bear medial or centrally disposed indentations or rounded corner portions 25 for locating and receiving the elastic member 14. This prevents dislocation of the elastic member 14 and insures the application of co-axial thrust forces to the two members 11 and 12 in operation.

It further will be noted that the one end of the outer housing member 11 is open as indicated at 26 in FIG. 1, for receiving the substantially intermating cross-sectioned plunger member 12 in assembly.

With particular regard to the features of the plunger member 12, it will be understood from FIGS. 1 through 3, for example, that the same constitutes a generally rectangular parallelopiped of rectangular cross-section, dimensioned to fit closely within the hollow interior of the outer housing 11 (see FIG. 2). Specifically, the plunger member 12 comprises rectangular top and bottom walls 30, 31, interjoining sidewalls 32 and 33 and an inner end wall 34 formed with an elongated slotted opening 35 aligned for reception of the trigger mechanism 15 (see FIGS. 2-4). Plunger 12 encloses an internal entrapment chamber 37, accessible via an animal entrance opening 38 which will be amplified in greater detail presently.

The outer or opposite end of plunger member 11 is fully enclosed, either by an integral end wall (not shown) or optionally by an end cap 13 structured as a generally rectangular shaped box, open at one side and closely receptive of the outer end of the plunger; such cover or cap 13 being dimensioned generally in accordance with the cross-sectional dimensioning of the outer housing 11, but of shorter length than the such housing member, as best illustrated in FIG. 1. More particularly, the cap 13 comprises top and bottom walls 40, 41, sidewalls 42, and 43 and an outer end wall 44, integral with the several walls 40–43 thereof. As with the formation of the outer end of the housing 11, the junctions of the end wall 44 with the top and bottom walls 40, 41 of the cap 13 preferably are formed with central indentations or rounded corner portions 45 which serve as locating means for the elastic member 14, such indentations being aligned to correspond with the indentations 25 of the outer housing member 11.

Whether or not the plunger is enclosed by a removable cap 13 or is formed with an alternate integral end wall at its outer end, it is of great importance that the hollow interior of the plunger member form the entrapment chamber 37 which is totally enclosed and inaccessible except for the slotted opening 35 in the inner end wall 34 of the plunger and the animal entrance opening 38 formed in one of the sidewalls 32 or 33 thererof. In the particular illustrated case hereof, the entrance opening 38 is provided in the sidewall 32, adjacent the end cap 13. Opening 38 preferably is circular in formation and of a size to accommodate the girth of the particular class of animals to be entrapped, such as mice. Inasmuch as the hollow interior or chamber 37 of the plunger is substantially enclosed as before noted, there is a general absence of light therein, thus presenting a "black" hole which is generally attractive to a mouse for the purpose of enticing its entry into the entrapment chamber.

As with the construction of the housing 11, the plunger 12 preferably is formed, as by molding, to provide a unitary plastic member. If the optional end cap 13 is employed as opposed to an integral end wall at the outer end of the plunger, such cap 13 likewise is integrally formed of plastic in the preferred structure.

It readily will be understood that the close axial interfitting of the outer housing 11 and the plunger 12, adapts such members of co-axial relative movement, principally with the plunger member moving in and out of the hollow interior of the housing 11 through the latter's one open end 26. Since the application and training of the elastic member 14 about and between the two members 11 and 12 is principally along a vertical plane passing through the central axes thereof, (i.e. across the end, top and bottom walls thereof as illustrated), the elastic member provides a convenient, simple and low-cost means for providing selected axial thrust to normally urge the two members 11 and 12 into a collapsed state whereat the plunger resides substantially within the outer housing in the manner illustrated in FIG. 4. In such axially collapsed state, the sidewall 20 of the outer housing effectively closes over or blocks the animal entrance opening 38 in the opposing sidewall 32 of the plunger member. Thus, any animal within the entrapment chamber 37 will be blocked off from escape from the chamber 37, surrounded by an essentially double-walled enclosure, as illustrated in FIG. 4.

In order to effectuate selected co-axial collapse of the two members 11 and 12 and provide the desired entrapping activity, an appropriate triggering mechanism 15 is employed between the two members 11 and 12 to hold them separated or in an extended condition until such time as the desired collapsing movement thereof toward one another, is required.

As best shown in FIGS. 2–4 of the drawings, triggering mechanism 15 comprises an elongated flexible blade member 50, generally rectangular in shape with rounded over corners 51 at its outer end and a necked down or laterally diminished portion 52 at its operationally intermost end. The outer or free end of portion 52 is preferably fixed to the inner face of end wall 24 on housing 11, as by an appropriate adhesive, hot-melt plastic or other conventional fastening means 53, to provide a cantilever mount for the blade member.

The reduced or narrowed portion 52 of the cantilever mounted blade 50 promotes sensitive, flexible activity to the trigger so that its blade-like body readily moves about its anchored end (see FIG. 2). It also will be noted that the extending blade 50 in its unflexed state is generally operationally horizontal and aligned with the slotted opening 35 formed in the inner end wall 34 of the plunger member. Opening 35 is of a lateral size to accommodate the free passage of trigger blade 50, and importantly is of a vertical dimension sufficient to permit limited vertical movement of the blade in operation.

In order to provide a means for setting the trigger of the improved trap of this invention, blade 50 is formed with a detent projection 54 on its upper face, substantially midway of its length. Such detent means comprising an inclined projection having a sharp tooth formation of sufficient vertical dimension to engage the outer face of the plunger's end wall 34 along the upper edge of the opening 35 herein. In this set condition the trigger blade 50 is substantially level or horizontal as best illustrated in FIG. 2. With the elastic member 14, trained about the two members 11 and 12, the trigger mechanism may be set so that the detent means 54 is removably engaged with the end wall 34 of the plunger. This condition holds the two members 11 and 12 apart or in an axially extended relation, as shown in FIGS. 1–3.

It will be understood that by depressing the flexible trigger body 50 downwardly, as by the weight of the animal (see FIG. 4), the detent means 54 is disengaged from end wall 34 to register with and pass through the slotted opening 35, permitting the end wall 34 of the plunger to escape past the detent means under the urging of the axial force applied by the flexible elastic band 14. This causes the plunger member 12 to move rapidly into the interior of the housing until end wall 34 thereof engages the inner face of the opposing end wall 24 on housing 11 (see FIG. 4). As previously mentioned, with such closing or tripping action, the animal entrance 38 is effectively blocked off by the sidewall 20 of the housing to entrap the live animal.

In operation, the black hole presented by the aperture 38 and the lightless interior of the chamber 37, is attractive to the mouse, enticing him to explore the chamber 37. In order to promote such entry, suitable bait 56 is applied, either to the trigger blade 50 within the plunger chamber 37, or preferably on the outer end face of the plunger's end wall 34, where, while actually inaccessible to the mouse, its odor induces the animal's appetite, enticing him onto the body of the trigger plate to release the detent means, as above noted.

From the foregoing description, it readily will be appreciated that the arrangement of elements and parts in the trap of the described trap invention, promotes user safety. For example, baiting of the trap is effected conveniently and safely by removing the elastic band 14 from members 11 and 12, withdrawing the plunger from the housing and applying peanut butter or bait material 56 to the outside face of the inner wall 34 on the plunger. The plunger is then reinserted into the open end of the housing 11 with the projecting trigger plate 50 extending through the slotted aperture 35 thereof. The elastic band is then reapplied about the ends and lengthwise across the two members 11 and 12 to urge the same toward one another. In order to set the trap, the plunger wall 34 is positioned against the detent 53 with the flexible trigger plate extending into the chamber 37, as illustrated in FIG. 2. It will be appreciated in this regard that if the two members 11 and 12 are axially collapsed (as in FIG. 4), the sloping upper face 55 of the detent means, serves to automatically depress the trigger plate as the plunger member is withdrawn axially outwardly of the housing 11. As soon as the detent passes through opening 35, the blade 50 snaps upwardly behind plunger wall 34 so that upon releasing the plunger, the trigger is set with the band 14 tensioned. With this arrangement, the user is fully protected from the trigger mechanism.

While the aforedescribed trap is primarily intended as a throw-away commodity in which the entrapped animal is disposed of along with the trap without endangering or exposing the user to the animal, in certain cases it may be desirable to reuse the trap. To that end, the removable cap 13 permits the user to have access to the interior of the entrapment chamber 37 for removal of the animal. In the case of mice, it is essential that they have water or liquid at frequent intervals and if the entrapped live animal is prevented from drinking while he is in chamber 37, death will follow. The success of the trap is readily perceived by merely picking up the sprung trap and feeling the weight of the animal therein. If the trap per chance has been sprung without capturing an animal, the light weight of the trap will be readily apparent to the user.

Having thus described this invention, it is believed that those of normal skill in this art will readily appreciate and recognize its novel concepts and departure from prior art traps, and will understand that while its features and structure have been described in association with a preferred illustrative embodiment, set out in the specification, the described form is subject to variation and substitution of equivalents without departing from the invention. Therefore, it is intended that the current invention be unlimited by the foregoing description except as may appear in the following appended claims:

The embodiments of the invention in which an exclusive property or privilege is claimed are defined as follows:

1. A trap for the live entrapment of small animals, such as mice, comprising: a pair of co-axially interfitting hollow members, namely, a hollow plunger member and a hollow housing member; said plunger member being walled on all sides to provide an internal entrapment chamber substantially enclosed except for an animal entrance opening through one side thereof; said housing member being enclosed on all sides except for one open end through which said plunger member is removably received; said members having mating cross-sectional configurations whereby said plunger member fits closely within the interior of said housing member for co-axial sliding movement therealong and whereby said animal entrance is closed by an opposing wall of said housing member as said plunger member moves into said housing member; thrust imposing means engaging the exterior of said two members and operable to move said plunger member rapidly into said housing member, one-piece trigger means comprising an elongated member mounted to extend between the closed end of said housing member and the interior of said entrapment chamber; and detent means cooperating with said trigger means and plunger member to releasably hold the latter in position for thrust imposed movement into said housing member when released from said detent means, said plunger member when in said position having said animal entrance opening therein accessibly located outwardly of said housing member.

2. The combination of claim 1, wherein said plunger member is formed with one open end, and cap means removably mounted over said open end and held in place thereat by said thrust imposing means to provide selected access to said entrapment chamber.

3. The combination of claim 1, wherein said trigger means comprises a flexible, cantilever mounted blade, and means connecting said blade to an interior end wall of said housing member in position to extend through an opening formed in an opposing end wall of said plunger member whereby the free end of said blade is accessible to an animal within said entrapment chamber.

4. The combination of claim 3, wherein said detent means operatively engages said opposing end wall of said plunger member within the interior of said housing member, said detent means being formed to slideably disengage said opposing end wall and pass through said opening therein when said blade is depressed within said entrapment chamber.

5. The combination of claim 1, wherein said thrust imposing means comprises an elastic member tensioned about the exterior of said two members.

* * * * *